(12) United States Patent
Wu et al.

(10) Patent No.: US 12,265,224 B2
(45) Date of Patent: Apr. 1, 2025

(54) NEAR EYE DISPLAY APPARATUS

(71) Applicants: Beijing BOE Optoelectronics Technology Co., Ltd., Beijing (CN); BOE Technology Group Co., Ltd., Beijing (CN)

(72) Inventors: Yulong Wu, Beijing (CN); Ke Li, Beijing (CN); Ruijun Dong, Beijing (CN); Chenru Wang, Beijing (CN); Na Han, Beijing (CN); Jiarong Bai, Beijing (CN); Lili Chen, Beijing (CN); Hao Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 540 days.

(21) Appl. No.: 17/638,084

(22) PCT Filed: Jan. 7, 2021

(86) PCT No.: PCT/CN2021/070662
§ 371 (c)(1),
(2) Date: Feb. 24, 2022

(87) PCT Pub. No.: WO2021/139725
PCT Pub. Date: Jul. 15, 2021

(65) Prior Publication Data
US 2022/0276490 A1    Sep. 1, 2022

(30) Foreign Application Priority Data

Jan. 10, 2020  (CN) .......................... 202010026691.8

(51) Int. Cl.
*G02B 27/01*    (2006.01)

(52) U.S. Cl.
CPC .. *G02B 27/0172* (2013.01); *G02B 2027/0178* (2013.01)

(58) Field of Classification Search
CPC .... G02B 27/01–0189; G02B 2027/0105–0198
See application file for complete search history.

(56) References Cited

U.S. PATENT DOCUMENTS

| | | | | |
|---|---|---|---|---|
| 2015/0070773 A1* | 3/2015 | Wang | ....................... | G02B 5/30 359/631 |
| 2020/0348522 A1* | 11/2020 | Xiao | .................... | G02B 5/3033 |
| 2021/0364798 A1 | 11/2021 | Dong et al. | | |

FOREIGN PATENT DOCUMENTS

| | | |
|---|---|---|
| CN | 107450184 A | 12/2017 |
| CN | 206805009 U | 12/2017 |

(Continued)

OTHER PUBLICATIONS

International Search Report, mailed Mar. 26, 2021, from PCT Application No. PCT/CN2021/070662.

*Primary Examiner* — Bao-Luan Q Le
*Assistant Examiner* — Christopher A Lamb, II
(74) *Attorney, Agent, or Firm* — Workman Nydegger (57) ABSTRACT

Disclosed is a near eye display apparatus, comprising a display screen and an imaging system. The imaging system comprises a biconvex lens, a transflective plane mirror and a transflective curved mirror. The biconvex lens is configured to magnify a display image of the display screen; the transflective plane mirror is configured to receive imaging light from the biconvex lens and reflect same to the transflective curved mirror; and the transflective curved mirror is configured to converge the imaging light and reflect same to the position(s) where human eyes are located.

20 Claims, 5 Drawing Sheets

(56) References Cited

FOREIGN PATENT DOCUMENTS

| | | |
|---|---|---|
| CN | 110161688 A | 8/2019 |
| CN | 110579880 A | 12/2019 |
| CN | 111123520 A | 5/2020 |
| CN | 211014865 U | 7/2020 |
| CN | 111624767 A | 9/2020 |
| EP | 2194418 A1 | 6/2010 |
| KR | 20130116547 A | 10/2013 |

* cited by examiner

NEAR EYE DISPLAY APPARATUS

CROSS REFERENCE TO RELATED APPLICATIONS

The present disclosure is a national phase entry under 35 U.S.C. § 371 of International Application No. PCT/CN2021/070662, filed on Jan. 7, 2021, which claims priority of Chinese Patent Application No. 202010026691.8, filed with the China National Intellectual Property Administration (CNIPA) on Jan. 10, 2020, and entitled "NEAR EYE DISPLAY APPARATUS", the entire content of which is incorporated herein by reference.

FIELD

The present disclosure relates to the technological field of display, in particular to a near eye display apparatus.

BACKGROUND

With the continuous development of Virtual Reality (VR) and Augmented Reality (AR) technologies in recent years, near eye display products have gradually been widely expanded in civilian fields such as film and television, education, and medical treatment from initial deployment in military fields. Since an image source of a near eye display product is very small, the product needs to be set close to human eyes in order to enable the image to be clearly imaged within an observable range of the human eyes, making the design of near eye display apparatuses quite difficult.

SUMMARY

Embodiments of the present disclosure provide a near eye display apparatus including:
  a display screen, configured to display an image; and
  an imaging system, arranged on a light emitting side of the display screen, configured to image the image displayed by the display screen at a position where a human eye is located, and including:
    a biconvex lens, arranged on the light emitting side of the display screen, and configured to magnify the image displayed by the display screen;
    a transflective plane mirror, arranged on a side of the biconvex lens facing away from the display screen, and configured to receive an imaging light from the biconvex lens and reflect the imaging light; wherein a line connecting an optical center of the transflective plane mirror with an optical center of the biconvex lens is a first connecting line; and
    a transflective curved mirror, arranged on a reflected optical path of the transflective plane mirror, and configured to converge the imaging light and reflect the converged imaging light to the position where the human eye is located through the transflective plane mirror; wherein a line connecting an optical center of the transflective curved mirror with the optical center of the transflective plane mirror is a second connecting line, and the first connecting line intersects the second connecting line.

In one possible implementation, in the near eye display apparatus provided by embodiments of the present disclosure, the display screen is arranged within one focal length of the imaging system.

In one possible implementation, in the near eye display apparatus provided by embodiments of the present disclosure, an exit pupil distance of the imaging system is greater than 18 mm.

In one possible implementation, in the near eye display apparatus provided by embodiments of the present disclosure, a distance between the optical center of the biconvex lens and the optical center of the transflective plane mirror is 7 mm to 10 mm.

In one possible implementation, in the near eye display apparatus provided by embodiments of the present disclosure, the distance between the optical center of the biconvex lens and the optical center of the transflective plane mirror is 8.7 mm to 8.8 mm.

In one possible implementation, in the near eye display apparatus provided by embodiments of the present disclosure, a distance between the optical center of the transflective plane mirror and the optical center of the transflective curved mirror is 8 mm to 11 mm.

In one possible implementation, in the near eye display apparatus provided by embodiments of the present disclosure, the distance between the optical center of the transflective plane mirror and the optical center of the transflective curved mirror is 9.7 mm to 9.8 mm.

In one possible implementation, in the near eye display apparatus provided by embodiments of the present disclosure, the first connecting line is perpendicular to the second connecting line.

In one possible implementation, in the near eye display apparatus provided by embodiments of the present disclosure, two optical surfaces of the biconvex lens are spherical surfaces, odd aspheric surfaces, even aspheric surfaces or free-form surfaces.

In one possible implementation, in the near eye display apparatus provided by embodiments of the present disclosure, both the two optical surfaces of the biconvex lens satisfy the following relation:

$$z = \frac{cr^2}{1+\sqrt{1-(1+k)c^2r^2}} + a_1 r^2 + a_2 r^4 + a_3 r^6 + a_4 r^8 + a_5 r^{10}.$$

Here, z represents a surface type equation of the optical surface, c represents a radius of curvature, k represents a quadratic surface coefficient, r represents a half-aperture diameter, and $a_1$, $a_2$, $a_3$, $a_4$, and $a_5$ represent coefficients. In one possible implementation, in the near eye display apparatus provided by embodiments of the present disclosure, an optical surface, close to the display screen, of the biconvex lens satisfies:
  r=−49.00863899098125 mm;
  k=−95.04941082200814;
  $a_1$=0;
  $a_2$=−1.037904547482000×$^{-6}$;
  $a_3$=−1.752251362999443×$10^{-8}$;
  $a_4$=7.636861093444737×$10^{-11}$; and
  $a_5$=−4.351559618685465×$10^{-13}$.

An optical surface, facing away from the display screen, of the biconvex lens satisfies:
  r=14.05871803442135 mm;
  k=−1.367399296176254;
  $a_1$=0;
  $a_2$=−6.706673225527226×$10^{-5}$;
  $a_3$=8.892596162790160×$10^{-7}$;
  $a_4$=2.719516289317158×$10^{-9}$; and
  $a_5$=−2.562235658581397×$10^{-11}$.

In one possible implementation, in the near eye display apparatus provided by embodiments of the present disclosure, two optical surfaces of the transflective curved mirror are parallel to each other; and the two optical surfaces of the transflective curved mirror are spherical surfaces, odd aspheric surfaces, even aspheric surfaces or free-form surfaces.

In one possible implementation, in the near eye display apparatus provided by embodiments of the present disclosure, both the two optical surfaces of the transflective curved mirror satisfy the following relation:

$$z = \frac{cr^2}{1 + \sqrt{1 - (1+k)c^2r^2}} + a_1 r^2 + a_2 r^4 + a_3 r^6 + a_4 r^8 + a_5 r^{10}.$$

Here, z represents a surface type equation of the optical surface, c represents a radius of curvature, k represents a quadratic surface coefficient, r represents a half-aperture diameter, and $a_1$, $a_2$, $a_3$, $a_4$, and $a_5$ represent coefficients.

In one possible implementation, in the near eye display apparatus provided by embodiments of the present disclosure, the optical surfaces of the transflective curved mirror satisfy:

r=−52.20409394488124 mm;
k=−1.604779554699603;
$a_1$=0;
$a_2$=−4.991846957838716×10$^{-6}$;
$a_3$=2.130618444391338×10$^{-8}$;
$a_4$=−1.601068438007377×10$^{-10}$; and
$a_5$=3.674816411704089×10$^{-13}$.

In one possible implementation, in the near eye display apparatus provided by embodiments of the present disclosure, a surface of the transflective plane mirror and a surface of the transflective curved mirror each is provided with an optical thin film, and a ratio of light transmission to light reflection of the optical thin film is 4:6 to 5:5.

In one possible implementation, in the near eye display apparatus provided by embodiments of the present disclosure, the near eye display apparatus is a pair of eyeglasses or a helmet.

The transflective curved mirror is reused as a lens of the pair of eyeglasses or a lens of the helmet.

DETAILED DESCRIPTION OF THE EMBODIMENTS

In order to enable the above objectives, features and advantages of the present disclosure more apparent and understandable, the present disclosure will be further described below in connection with the accompanying drawings and embodiments. However, the example implementations can be implemented in a variety of forms, but should not be deemed to be limited to the implementations described herein; rather, providing these implementations enables the present disclosure more comprehensive and complete and communicates the ideas of the example implementations to those of skill in the art in a comprehensive manner. Same drawing references in the drawings indicate the same or similar structures, and thus repetitive descriptions of them will be omitted. Words used to express positions and orientations described in the present disclosure are illustrated using the accompanying drawings as examples, but changes may be made as needed, and any changes made are included in the scope of protection of the present disclosure. The accompanying drawings of the present disclosure are used only to show the relative position relationship, but do not represent the true scale.

A near eye display apparatus is a display apparatus that is worn on a user's eyes. For example, a near eye display apparatus is usually presented in the form of a pair of eyeglasses or a helmet. The near eye display apparatus can provide the user with AR and VR experiences. The AR near eye display technology is to display a virtual image generated by the near eye display apparatus with a real-world live image in a form of superposition, so that the user can see a final augmented live image on a screen. The VR near eye display technology is to display images of the left eye and the right eye on near eye displays corresponding to the left eye and the right eye respectively, and the left eye and the right eye can synthesize stereo vision in the brain after obtaining image information with differences.

Current near-eye display apparatuses have problems of being large in size, heavy in weight and poor in image quality. Embodiments of the present disclosure provide a near eye display apparatus to reduce the weight of a whole machine and improve the imaging quality.

Figure 1:
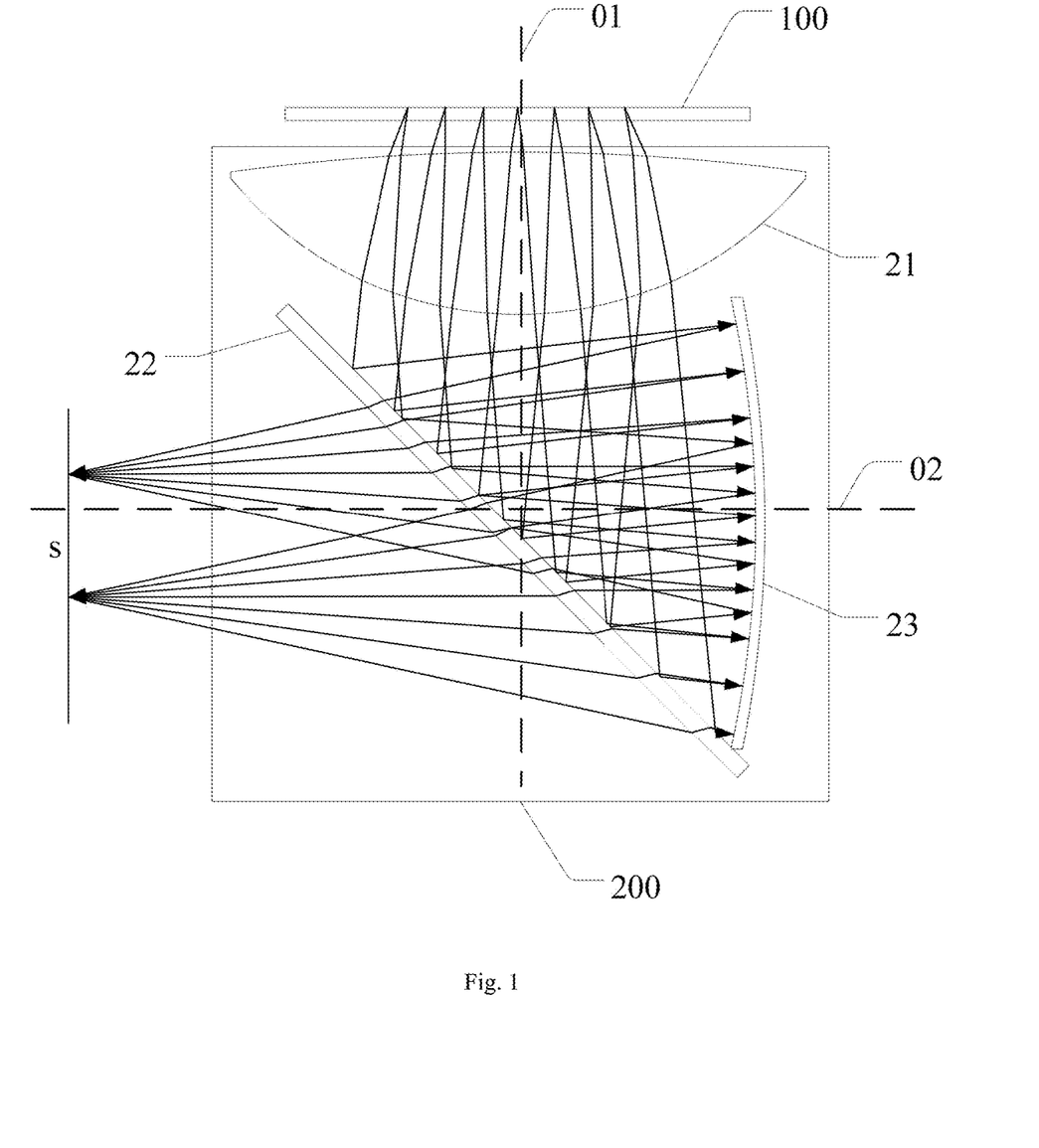
FIG. 1 is a schematic structural diagram of a near eye display apparatus provided by an embodiment of the present disclosure.

FIG. 1 is a schematic structural diagram of a near eye display apparatus provided by an embodiment of the present disclosure. As shown in FIG. 1, the near eye display apparatus provided by embodiments of the present disclosure, includes a display screen 100 and an imaging system 200.

The display screen 100 is configured to display an image. As an image source, the display screen 100 is configured to display the image. The display screen 100 may be a liquid crystal display screen or an organic light emitting diode display screen, which is not limited here. The display screen 100 in the near eye display apparatus is usually relatively small in size, and installed in the near eye display apparatus. In implementations, a display screen with higher resolution may be applied, and a display image with a more detailed picture can be provided.

The imaging system 200 is arranged on a light emitting side of the display screen 100, and configured to image a display image of the display screen 100 at a position s where human eye(s) is/are located.

The indispensable imaging system 200 in the near eye display apparatus is arranged on the light emitting side of the display screen 100, and configured to image the display image of the display screen 100 at the position where the human eye is located. The near eye display apparatus may include two display screens 100 and two imaging systems 200, corresponding to the left eye and the right eye respectively. Some information differences may exist between the images displayed by the display screens corresponding to the left eye and the right eye, so that after the left eye and the right eye receive the corresponding images, the images may be synthesized in the brain to produce a three-dimensional visual effect.

As shown in FIG. 1, the imaging system 200 includes:
a biconvex lens 21, arranged on the light emitting side of the display screen 100;
a transflective plane mirror 22, arranged on a side, facing away from the display screen 100, of the biconvex lens 21; and
a transflective curved mirror 23, arranged on a reflected optical path of the transflective plane mirror 22.

A line connecting an optical center of the biconvex lens 21 with an optical center of the transflective plane mirror 22 is a first connecting line 01. A line connecting the optical center of the transflective plane mirror 22 with an optical center of the transflective curved mirror 23 is a second connecting line 02. The first connecting line 01 intersects the second connecting line 02.

A light emitted from the display screen 100 first enters the biconvex lens 21, and the biconvex lens 21 is configured to magnify the display image. After the light passes through the action of the biconvex lens 21, the light enters the transflective plane mirror 22, and the transflective plane mirror 22 reflects the light toward the transflective curved mirror 23. Then, after the light passes through the reflection of the transflective curved mirror 23, the light is again reflected toward a side of the transflective plane mirror 22 and converged. Finally, the light enters the position s where the human eye is located through the transflective curved mirror 23.

The transflective plane mirror 22 and the transflective curved mirror 23 have a function of bending back the light, so that the light path can be prolonged by reflection, instead of designing the near eye display apparatus according to the length of the light path, which is conducive to reducing the overall size of the near eye display apparatus.

In the imaging system 200, the biconvex lens 21 and the transflective curved mirror 23 are adopted, so that three curved surfaces can be optimized to improve the imaging quality of the imaging system, avoid the introduction of more imaging devices to optimize parameters, and reduce the quantity of lenses used overall to simplify the structure of the imaging system and reduce the overall weight of the near eye display apparatus.

In implementations, in the near eye display apparatus provided by embodiments of the present disclosure, the display screen 100 is arranged within one focal length of the imaging system 200.

In the near eye display apparatus, the size of the display screen 100 is relatively small, and the rich image details cannot be directly observed by the human eyes when a display screen with a relatively small size is adopted to show rich image details. Therefore, the display screen 100 may be placed within one focal length of the imaging system 200, so that the imaging system can create an upright and magnified virtual image after magnifying the display image of the display screen 100, so that the human eyes can view the details in the display image.

By adjusting a distance between the display screen 100 and the imaging system 200, a distance of an imaging position can be also affected. When the distance between the display screen 100 and the imaging system 200 decreases, the image seen by the human eyes is further; and when the distance between the display screen 100 and the imaging system 200 increases, the image seen by the human eyes is closer. Therefore, in practical application, the imaging position can be adjusted through adjusting the distance between the display screen 100 and the imaging system 200 to find the best imaging position.

As shown in FIG. 1, a distance between the imaging position s and the optical center of the transflective plane mirror 22 is an exit pupil distance of the imaging system 200. In the near eye display apparatus provided by embodiments of the present disclosure, the exit pupil distance of the imaging system 200 is greater than 18 mm, so that the human eyes can be avoided being too close to the near eye display apparatus, it is more convenient for a viewer to wear, and the design is optimized.

In implementations, in the near eye display apparatus provided by embodiments of the present disclosure, as shown in FIG. 1, the first connecting line of the optical center of the biconvex lens 21 and the optical center of the transflective plane mirror 22 is perpendicular to the second connecting line of the optical center of the transflective plane mirror 22 and the optical center of the transflective curved mirror 23. Taking a structure shown in FIG. 1 as an example, when a display surface of the display screen 100 is vertically downward, the transflective plane mirror 22 may be set at an inclination of 45° from the horizontal plane, while the transflective curved mirror 23 is set to be vertical to the horizontal plane, so that the first connecting line of the optical center of the biconvex lens 21 and the optical center of the transflective plane mirror 22 is perpendicular to the second connecting line of the optical center of the transflective plane mirror 22 and the optical center of the transflective curved mirror 23 to simplify the design of the optical path.

As shown in FIG. 1, a distance between the optical center of the biconvex lens 21 and the optical center of the transflective plane mirror 22 refers to a distance between a center point of an optical surface of the side, facing away from the display screen 100, of the biconvex lens 21 and a center point of an optical surface of a side, facing the biconvex lens 21, of the transflective plane mirror 22. In the near eye display apparatus provided by embodiments of the present disclosure, the distance between the optical center of the biconvex lens 21 and the optical center of the transflective plane mirror 22 is 7 mm to 10 mm. When the value ranges from 8.7 mm to 8.8 mm, the imaging effect is relatively good.

As shown in FIG. 1, a distance between the optical center of the transflective plane mirror 22 and the optical center of the transflective curved mirror 23 refers to a distance between a center point of an optical surface of a side, facing the transflective curved mirror 23, of the transflective plane mirror 22 and a center point of an optical surface of a side, facing the transflective plane mirror 22, of the transflective curved mirror 23. In the near eye display apparatus provided by embodiments of the present disclosure, the distance between the optical center of the transflective plane mirror 22 and the optical center of the transflective curved mirror 23 is 8 mm to 11 mm. When the value ranges from 9.7 mm to 9.8 mm, the imaging effect is relatively good.

A surface type of each lens in the imaging system and distances between the lenses affect the imaging quality. The embodiments of the present disclosure take into account various factors such as the field curvature, the distortion and the optical transfer function to determine spacings between various optical components and the surface type of each optical component. In implementations, in the near eye display apparatus provided by embodiments of the present disclosure, two optical surfaces of the biconvex lens 21 may be designed to be any of spherical surfaces, odd aspheric surfaces, even aspheric surfaces or free-form surfaces. An aspheric lens has a more comprehensive range of parameters that can be optimized compared to a spherical lens, and therefore has a better image quality. Odd aspheric surfaces are asymmetric aspheric surfaces, and even aspheric surfaces are symmetric aspheric surfaces. Considering the processing difficulty, the two optical surfaces of the biconvex lens 21 may be designed to be even aspheric surfaces.

For example, both the two optical surfaces of the biconvex lens 21 may satisfy the following relation:

$$z = \frac{cr^2}{1+\sqrt{1-(1+k)c^2r^2}} + \alpha_1 r^2 + a_2 r^4 + a_3 r^6 + a_4 r^8 + \alpha_5 r^{10}.$$

Here, z represents a surface equation of the optical surface, c represents a radius of curvature, k represents a quadratic surface coefficient, r represents a half-aperture diameter, and $a_1$, $a_2$, $a_3$, $a_4$, and $a_5$ represent coefficients.

The value of k can affect the surface type of the optical surface. $a_1$, $a_2$, $a_3$, $a_4$ and $a_5$ are the coefficients of higher order terms. The more the quantity of the higher order terms, the finer the design. When performing optical design, the imaging quality of the biconvex lens may be optimized by increasing the quantity of the higher order terms.

Optionally, when an optical surface, close to the display screen 100, of the biconvex lens 21 satisfies the above equation, the value of each parameter is as follows:

r=−49.00863899098125 mm;
k=−95.04941082200814;
$a_1$=0;
$a_2$=−1.037904547482000×10$^{-6}$;
$a_3$=−1.752251362999443×10$^{-8}$;
$a_4$=7.636861093444737×10$^{-11}$; and
$a_5$=−4.351559618685465×10$^{-13}$.

Optionally, when the optical surface, facing away from the display screen 100, of the biconvex lens 21 satisfies the above equation, the value of each parameter is as follows:

r=14.05871803442135 mm;
k=−1.367399296176254;
$a_1$=0;
$a_2$=−6.706673225527226×10$^{-5}$;
$a_3$=8.892596162790160×10$^{-7}$;
$a_4$=2.719516289317158×10$^{-9}$; and
$a_5$=−2.562235658581397×10$^{-11}$.

Thus, the optical design of the two optical surfaces of the biconvex lens 21 is completed.

In implementations, two optical surfaces of the transflective curved mirror 23 may be designed to be any of spherical surfaces, odd aspheric surfaces, even aspheric surfaces or free-form surfaces. An aspheric lens has a more comprehensive range of parameters that can be optimized compared to a spherical lens, and therefore has a better image quality. Odd aspheric surfaces are asymmetric aspheric surfaces, and even aspheric surfaces are symmetric aspheric surfaces. Considering the processing difficulty, the two optical surfaces of the transflective curved mirror 23 may be designed to be even aspheric surfaces.

For example, both the two optical surfaces of the transflective curved mirror 23 may satisfy the following relation:

$$z = \frac{cr^2}{1+\sqrt{1-(1+k)c^2r^2}} + \alpha_1 r^2 + a_2 r^4 + a_3 r^6 + a_4 r^8 + \alpha_5 r^{10}.$$

Here: z represents a surface equation of the optical surface, c represents a radius of curvature, k represents a quadratic surface coefficient, r represents a half-aperture diameter, and $a_1$, $a_2$, $a_3$, $a_4$, and $a_5$ represent coefficients.

The value of k can affect the surface type of the optical surface. $a_1$, $a_2$, $a_3$, $a_4$ and $a_5$ are the coefficients of higher order terms. The more the quantity of the higher order terms, the finer the design. When performing optical design, the imaging quality of the transflective curved mirror may be optimized by increasing the quantity of the higher order terms.

Optionally, when the optical surfaces of the transflective curved mirror 23 satisfy the above equation, the value of each parameter is as follows:

r=−52.20409394488124 mm;
k=−1.604779554699603;
$a_1$=0;
$a_2$=−4.991846957838716×10$^{-6}$;
$a_3$=2.130618444391338×10$^{-8}$;
$a_4$=−1.601068438007377×10$^{-10}$; and
$a_5$=3.674816411704089×10$^{13}$.

Thus, the optical design of the two optical surfaces of the transflective curved mirror 23 is completed.

The values of the parameters of the optical surfaces of the biconvex lens 21 and the transflective curved mirror 23 may be optimized according to the final performance of the imaging system in terms of the field curvature, the distortion and the optical transfer function, etc. The surface types of the biconvex lens 21 and the transflective curved mirror 23 as well as the spacings between the optical components affect the imaging quality of the imaging system, and various factors need to be considered during the optical design.

During the optical design, the biconvex lens 21 and the transflective curved mirror 23 may also be selected as odd aspheric surfaces or free-form surfaces. The embodiments of the disclosure only take the implementation schemes of even aspheric surfaces as an example, and the specific surface types of the biconvex lens 21 and the transflective curved mirror 23 are not limited. When other types of surface types are selected for the biconvex lens 21 and the transflective curved mirror 23, the corresponding parameters should be reset.

Embodiments of the present disclosure also provide imaging performance of the imaging system 200 in terms of the field curvature, the distortion and the optical transfer function when the various optical components in the imaging system satisfy the above conditions.

Figure 2:
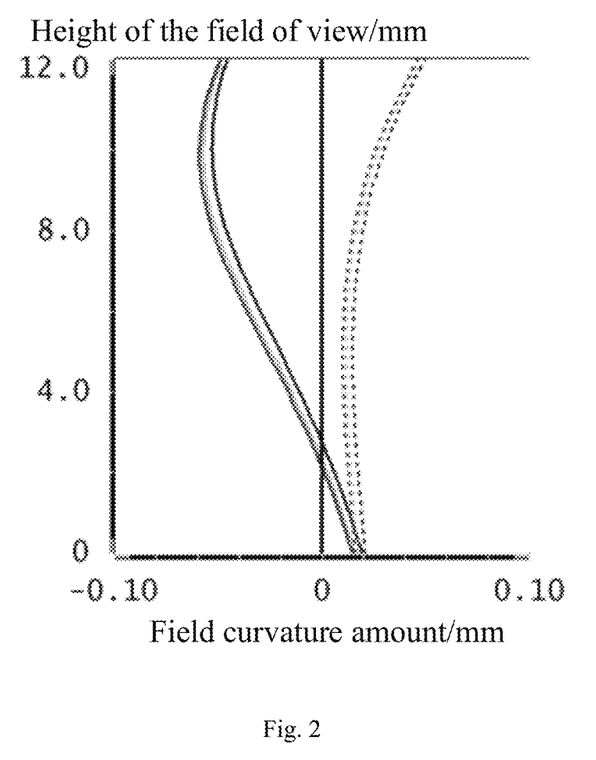
FIG. 2 is a field curvature diagram of a near eye display apparatus provided by an embodiment of the present disclosure.

FIG. 2 is a field curvature diagram of a near eye display apparatus provided by an embodiment of the present disclosure. The horizontal coordinate represents a field curvature amount, and the vertical coordinate represents a height of the field of view. The closer the field curvature amount of the imaging system at each height of the field of view is to 0, the better the imaging effect. The field curvature amounts in an arc vector direction and in a meridian direction are shown in the field curvature diagram, where the dashed line represents the field curvature amount in the arc vector direction, the solid line represents the field curvature amount in the meridian direction, and the different grayscales represent the field curvature amounts of different wavelengths of light. As shown in FIG. 2, the field curvature amount of the imaging system 200 provided by the embodiments of the present disclosure is controlled within ±0.1 after parameter optimization, the field curvature amount is relatively small, and the imaging effect is good.

Figure 3:
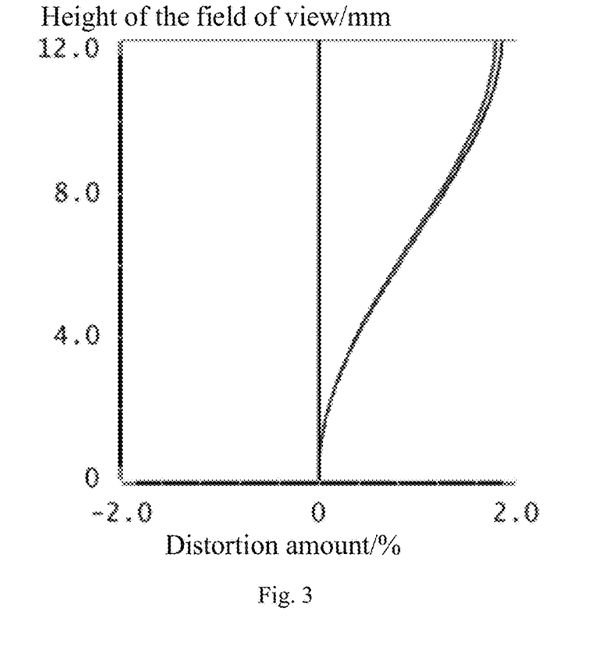
FIG. 3 is a distortion diagram of a near eye display apparatus provided by an embodiment of the present disclosure.

FIG. 3 is a distortion diagram of a near eye display apparatus provided by an embodiment of the present disclosure. The horizontal coordinate represents a distortion amount, and the vertical coordinate represents a height of the field of view. The closer the amount of the distortion of the imaging system at each height of the field of view is to 0, the better the imaging effec. In the distortion diagram, different grayscales represent the distortion amounts of different wavelengths of light. As shown in FIG. 3, the distortion amount of the imaging system 200 provided by the embodiments of the present disclosure is smaller than 2% after parameter optimization, the distortion amount is relatively small, and the imaging effect is good.

Figure 4:
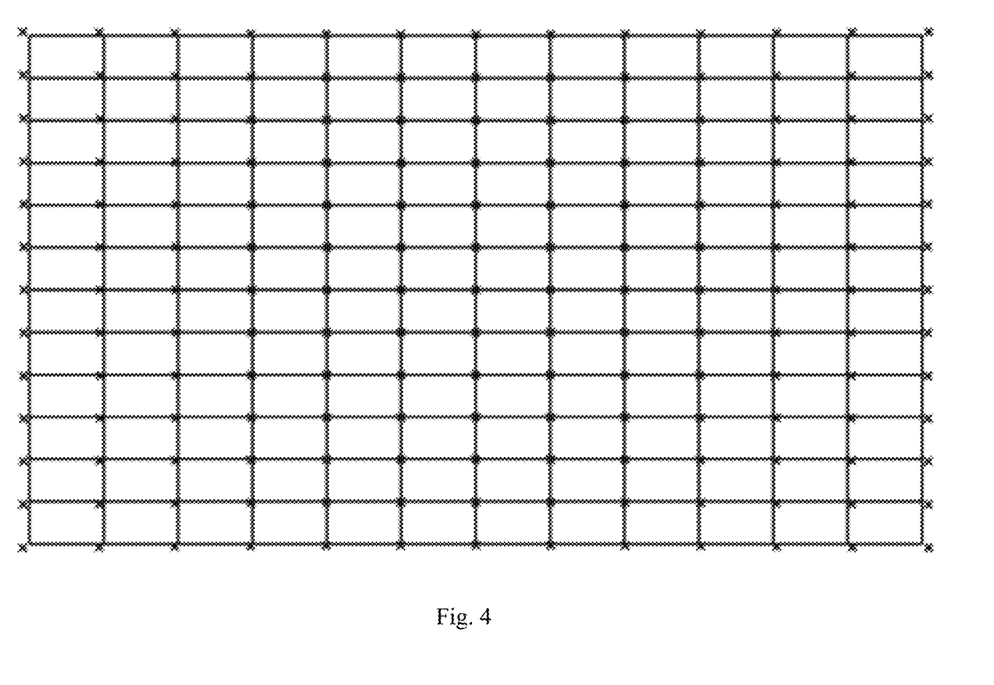
FIG. 4 is a mesh distortion diagram of a near eye display apparatus provided by an embodiment of the present disclosure.

FIG. 4 is a mesh distortion diagram of a near eye display apparatus provided by an embodiment of the present disclosure. "×" represents a real imaging point, and "·" represents an ideal imaging point. As shown in FIG. 3, the imaging system 200 provided by the embodiments of the present disclosure, after parameter optimization, has a smaller gap between the location of the real imaging point and the location of the ideal imaging point, the mesh distortion is less than 1.4%, the distortion amount is relatively small, and the imaging effect is good.

Figure 5:
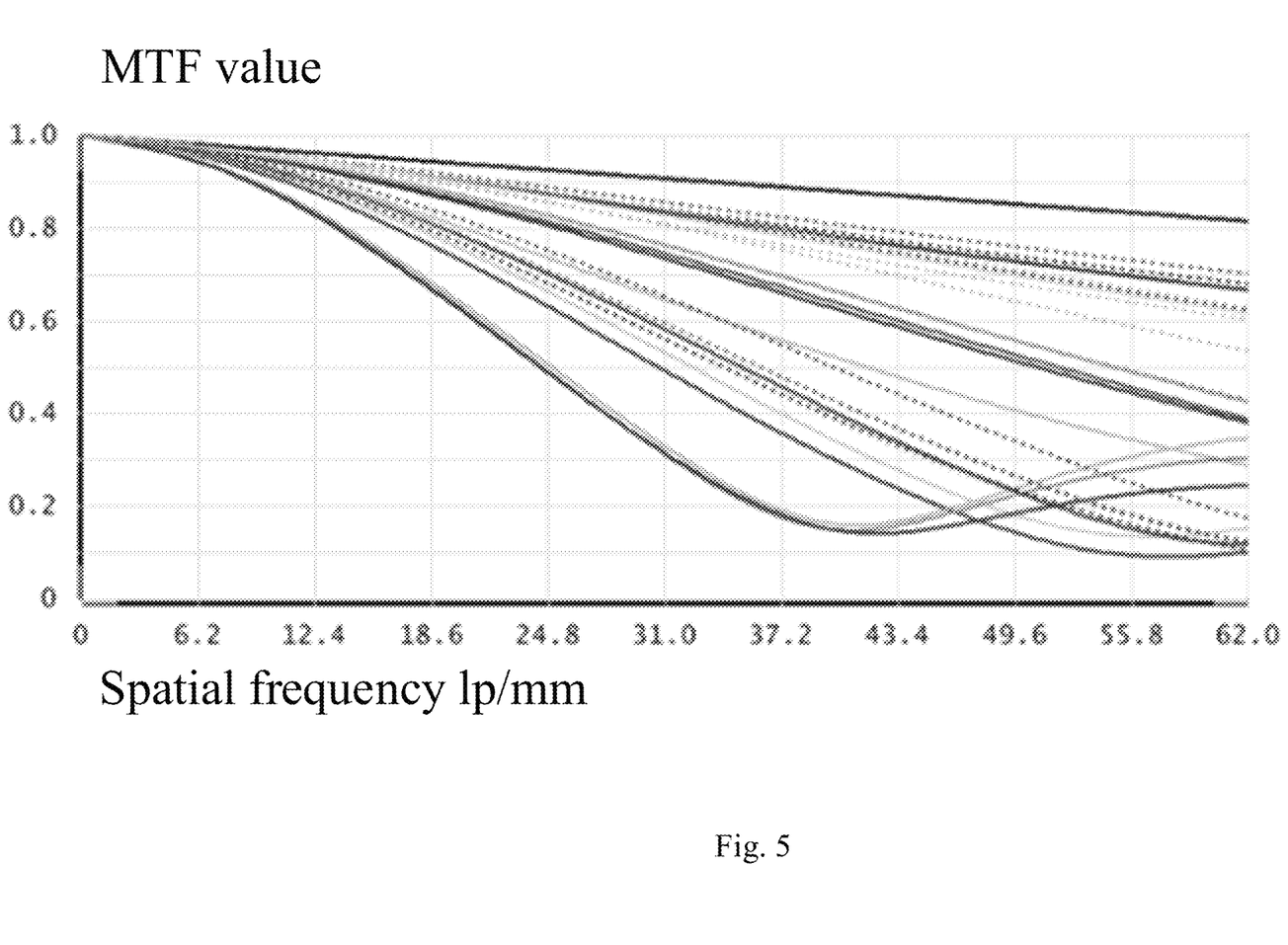
FIG. 5 is a curve diagram of an optical transfer function of a near eye display apparatus provided by an embodiment of the present disclosure.

FIG. 5 is a curve diagram of an optical transfer function of a near eye display apparatus provided by an embodiment of the present disclosure. The horizontal coordinate represents a spatial frequency, and the vertical coordinate represents a Modulation Transfer Function (MTF) value. The MTF value represents an important parameter of an optical system. The uppermost curve in FIG. 5 represents the diffraction limit when the field angle of view is 0. The closer the MTF values at different field angles of view are to the uppermost curve, the better the imaging effect of the imaging system. MTF curves in an arc vector direction and in a meridional direction are shown in the curve diagram of the optical transfer function, where the dashed line represents the MTF curve in the arc vector direction, the solid line represents the MTF curve in the meridional direction, and the different grayscales represent the MTF curves of different wavelengths of light. As shown in FIG. 5, according to the imaging system 200 provided by the embodiments of the present disclosure after parameter optimization, the optical transfer function of the full field of views is greater than 0.3 at 31 lp/mm, the optical transfer function of the full field of views is greater than 0.1 at 62 lp/mm, and it has a better imaging performance.

In the specific processing, the biconvex lens 21, the transflective plane mirror 22 and the transflective curved mirror 23 may be made of optical glass, resin, plastic and other materials, which is not limited here.

Optical thin films are arranged on surfaces of the transflective plane mirror 22 and the transflective curved mirror 23, and a ratio of light transmission to light reflection of the optical thin films is 4:6 to 5:5. The optical films in the embodiments of the present disclosure are made to have a transmission or reflection function by adjusting parameters such as the quantity of layers of the optical films, the refractive index of materials, and the thickness, using the thin film interference principle. Adjusting the above parameters can also control the ratio of light transmission to light reflection of the optical films.

In practical application, a reflected light of the transflective plane mirror 22 is used for imaging, but a reflected light of the transflective curved mirror 23 finally passes through the transflective plane mirror 22 before it enters the human eye, so the transmittance of the transflective plane mirror 22 is comparable to the reflectance of the transflective plane mirror 22, and neither too much reflected lights nor too much transmitted lights are lost. During application in the VR field, the reflectivity of the transflective curved mirror 23 may be increased to allow more lights to be used for imaging. During application in the AR field, an ambient light needs to pass through the transflective curved mirror 23 to participate in synthesizing image, and then the transmittance and reflectivity of the transflective curved mirror 23 need to be reasonably set. In the embodiments of the present disclosure, the ratio of light transmission to light reflection of the optical films of the surfaces of the transflective plane mirror 22 and the transflective curved mirror 23 may be controlled in the range of 4:6 to 5:5, which has a better imaging effect.

Figure 6:
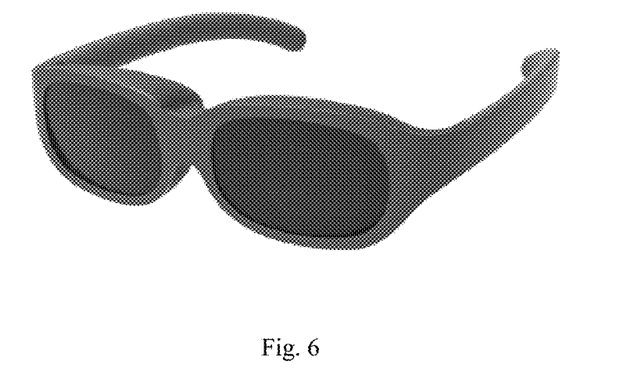
FIG. 6 is a schematic external view of a near eye display apparatus provided by an embodiment of the present disclosure.

The near eye display apparatus provided by the embodiments of the present disclosure may be a pair of eyeglasses or a helmet. In this case, the transflective curved mirror 23 may be reused as a lens of the pair of eyeglasses or a lens of the helmet, thus reducing the quantity of lenses used in the near eye display apparatus. When the near eye display apparatus is eyeglasses, its external view is as shown in FIG. 6. A left eyeglass lens may be set as one set of imaging system and display screen, and a right eyeglass lens may be set as another set of imaging system and display screen.

The near eye display apparatus provided by the embodiments of the present disclosure, includes: a display screen, configured to display an image; and an imaging system, arranged on a light emitting side of the display screen, and configured to image a display image of the display screen at a position where a human eye is located. The imaging system includes: a biconvex lens, arrangerd on the light emitting side of the display screen; a transflective plane mirror, arranged on a side, facing away from the display screen, of the biconvex lens; and a transflective curved mirror, arranged on a reflected optical path of the transflective plane mirror. A line connecting an optical center of the biconvex lens with an optical center of the transflective plane mirror intersects a line connecting the optical center of the transflective plane mirror with an optical center of the transflective curved mirror. The biconvex lens is configured to magnify the display image of the display screen, the transflective plane mirror is configured to receive an imaging light from the biconvex lens and reflect same, and the transflective curved mirror is configured to converge the imaging light and reflect same to the position where the human eye is located. The transflective plane mirror and the transflective curved mirror have a function of bending back the light, so that the light path can be prolonged by reflection, instead of designing the near eye display apparatus according to the length of the light path, which is conducive to reducing the overall size of the near eye display apparatus. In the imaging system, the biconvex lens and the transflective curved mirror are adopted, so that three curved surfaces can be optimized to improve the imaging quality of the imaging system, avoid the introduction of more imaging devices to optimize parameters, and reduce the quantity of lenses used overall to simplify the structure of the imaging system and reduce the overall weight of the near eye display apparatus.

Although preferred embodiments of the present disclosure have been described, those of skill in the art can make additional changes and modifications to these embodiments once the basic inventive concepts are known. Therefore, the appended claims are intended to be construed to include the preferred embodiments and all changes and modifications that fall within the scope of the present disclosure.

It is clear that those of skill in the art can make various modifications and variations to the present disclosure without departing from the spirit and scope of the present disclosure. Thus, if these modifications and variations of the present disclosure fall within the scope of the claims of the present disclosure and their technical equivalents, the present disclosure is also intended to include such modifications and variations.

What is claimed is:

1. A near eye display apparatus, comprising:
a display screen, configured to display an image; and
an imaging system, arranged on a light emitting side of the display screen, configured to image the image displayed by the display screen at a position where a human eye is located, and comprising:
a biconvex lens, arranged on the light emitting side of the display screen, and configured to magnify the image displayed by the display screen;
a transflective plane mirror, arranged on a side of the biconvex lens facing away from the display screen, and configured to receive an imaging light from the biconvex lens and reflect the imaging light; wherein a line connecting an optical center of the transflective plane mirror with an optical center of the biconvex lens is a first connecting line; and
a transflective curved mirror, arranged on a reflected optical path of the transflective plane mirror, and configured to converge the imaging light and reflect the converged imaging light to the position where the human eye is located through the transflective plane mirror; wherein a line connecting an optical center of the transflective curved mirror with the optical center of the transflective plane mirror is a second connecting line, and the first connecting line intersects the second connecting line;
wherein two optical surfaces of the biconvex lens are spherical surfaces, odd aspheric surfaces, even aspheric surfaces or free-form surfaces;
both the two optical surfaces of the biconvex lens satisfy following relation:

$$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10};$$

wherein z represents a surface type equation of the optical surface, c represents a radius of curvature, k represents a quadratic surface coefficient, r represents a half-aperture diameter, and $\alpha_1$, $\alpha_2$, $\alpha_3$, $\alpha_4$, and $\alpha_5$ represent coefficients;
an optical surface, close to the display screen, of the biconvex lens satisfies:
r=−49.00863899098125 mm;
k=−95.04941082200814;
$\alpha_1$=0;
$\alpha_2$=−1.037904547482000×10$^{-6}$;
$\alpha_3$=−1.752251362999443×10$^{-8}$;
$\alpha_4$=7.636861093444737×10$^{-11}$; and
$\alpha_5$=−4.351559618685465×10$^{-13}$; and
an optical surface, facing away from the display screen, of the biconvex lens satisfies:
r=14.05871803442135 mm;
k=−1.367399296176254;
$\alpha_1$=0;
$\alpha_2$=−6.706673225527226×10$^{-5}$;
$\alpha_3$=8.892596162790160×10$^{-7}$;
$\alpha_4$=2.719516289317158×10$^{-9}$; and
$\alpha_5$=−2.562235658581397×10$^{-11}$.

2. The near eye display apparatus according to claim 1, wherein the display screen is arranged within one focal length of the imaging system.

3. The near eye display apparatus according to claim 1, wherein an exit pupil distance of the imaging system is greater than 18 mm.

4. The near eye display apparatus according to claim 1, wherein a distance between the optical center of the biconvex lens and the optical center of the transflective plane mirror is 7 mm to 10 mm.

5. The near eye display apparatus according to claim 4, wherein the distance between the optical center of the biconvex lens and the optical center of the transflective plane mirror is 8.7 mm to 8.8 mm.

6. The near eye display apparatus according to claim 4, wherein a distance between the optical center of the transflective plane mirror and the optical center of the transflective curved mirror is 8 mm to 11 mm.

7. The near eye display apparatus according to claim 6, wherein the distance between the optical center of the transflective plane mirror and the optical center of the transflective curved mirror is 9.7 mm to 9.8 mm.

8. The near eye display apparatus according to claim 1, wherein the first connecting line is perpendicular to the second connecting line.

9. The near eye display apparatus according to claim 1, wherein two optical surfaces of the transflective curved mirror are parallel to each other; and the two optical surfaces of the transflective curved mirror are spherical surfaces, odd aspheric surfaces, even aspheric surfaces or free-form surfaces.

10. The near eye display apparatus according to claim 9, wherein both the two optical surfaces of the transflective curved mirror satisfy following relation:

$$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10};$$

wherein z represents a surface type equation of the optical surface, c represents a radius of curvature, k represents a quadratic surface coefficient, r represents a half-aperture diameter, and $\alpha_1$, $\alpha_2$, $\alpha_3$, $\alpha_4$, and as represent coefficients.

11. The near eye display apparatus according to claim 10, wherein the optical surfaces of the transflective curved mirror satisfy:
r=−52.20409394488124 mm;
k=−1.604779554699603;
$\alpha_1$=0;
$\alpha_2$=−4.991846957838716×10$^{-6}$;
$\alpha_3$=2.130618444391338×10$^{-8}$;
$\alpha_4$=−1.601068438007377×10$^{-10}$; and
$\alpha_5$=3.674816411704089×10$^{-13}$.

12. The near eye display apparatus according to claim 1, wherein a surface of the transflective plane mirror and a surface of the transflective curved mirror each is provided with an optical thin film, and a ratio of light transmission to light reflection of the optical thin film is 4:6 to 5:5.

13. The near eye display apparatus according to claim 1, wherein the near eye display apparatus is a pair of eyeglasses or a helmet; and the transflective curved mirror is reused as a lens of the pair of eyeglasses or a lens of the helmet.

14. A near eye display apparatus, comprising:
a display screen, configured to display an image; and
an imaging system, arranged on a light emitting side of the display screen, configured to image the image displayed by the display screen at a position where a human eye is located, and comprising:
a biconvex lens, arranged on the light emitting side of the display screen, and configured to magnify the image displayed by the display screen;
a transflective plane mirror, arranged on a side of the biconvex lens facing away from the display screen, and configured to receive an imaging light from the biconvex lens and reflect the imaging light; wherein a line connecting an optical center of the transflective plane mirror with an optical center of the biconvex lens is a first connecting line; and
a transflective curved mirror, arranged on a reflected optical path of the transflective plane mirror, and configured to converge the imaging light and reflect the converged imaging light to the position where the human eye is located through the transflective plane mirror; wherein a line connecting an optical center of the transflective curved mirror with the optical center of the transflective plane mirror is a second connecting line, and the first connecting line intersects the second connecting line;
wherein two optical surfaces of the transflective curved mirror are parallel to each other; and the two optical surfaces of the transflective curved mirror are spherical surfaces, odd aspheric surfaces, even aspheric surfaces or free-form surfaces;
both the two optical surfaces of the transflective curved mirror satisfy following relation:

$$z = \frac{cr^2}{1+\sqrt{1-(1+k)c^2r^2}} + \alpha_1 r^2 + a_2 r^4 + a_3 r^6 + a_4 r^8 + \alpha_5 r^{10};$$

wherein z represents a surface type equation of the optical surface, c represents a radius of curvature, k represents a quadratic surface coefficient, r represents a half-aperture diameter, and $\alpha_1$, $\alpha_2$, $\alpha_3$, $\alpha_4$, and as represent coefficients;
the optical surfaces of the transflective curved mirror satisfy:
r=−52.20409394488124 mm;
k=−1.604779554699603;
$\alpha_1$=0;
$\alpha_2$=−4.991846957838716×10$^{-6}$;
$\alpha_3$=2.130618444391338×10$^{-8}$;
$\alpha_4$=−1.601068438007377×10$^{-10}$; and
$\alpha_5$=3.674816411704089×10$^{-13}$.

15. The near eye display apparatus according to claim 14, wherein the display screen is arranged within one focal length of the imaging system.

16. The near eye display apparatus according to claim 14, wherein a distance between the optical center of the biconvex lens and the optical center of the transflective plane mirror is 7 mm to 10 mm.

17. The near eye display apparatus according to claim 16, wherein the distance between the optical center of the biconvex lens and the optical center of the transflective plane mirror is 8.7 mm to 8.8 mm.

18. The near eye display apparatus according to claim 16, wherein a distance between the optical center of the transflective plane mirror and the optical center of the transflective curved mirror is 8 mm to 11 mm.

19. The near eye display apparatus according to claim 14, wherein a surface of the transflective plane mirror and a surface of the transflective curved mirror each is provided with an optical thin film, and a ratio of light transmission to light reflection of the optical thin film is 4:6 to 5:5.

20. The near eye display apparatus according to claim 14, wherein the near eye display apparatus is a pair of eyeglasses or a helmet; and the transflective curved mirror is reused as a lens of the pair of eyeglasses or a lens of the helmet.

\* \* \* \* \*